United States Patent
Bowe et al.

(10) Patent No.: US 7,186,388 B2
(45) Date of Patent: Mar. 6, 2007

(54) CATALYTIC REACTOR

(75) Inventors: Michael Joseph Bowe, Preston (GB); Jason Andrew Maude, Cheadle (GB)

(73) Assignee: Compactgtl PLC, London (GB)

(*) Notice: Subject to any disclaimer, the term of this patent is extended or adjusted under 35 U.S.C. 154(b) by 147 days.

(21) Appl. No.: 10/491,784

(22) PCT Filed: Oct. 3, 2002

(86) PCT No.: PCT/GB02/04490

§ 371 (c)(1), (2), (4) Date: Apr. 6, 2004

(87) PCT Pub. No.: WO03/033134

PCT Pub. Date: Apr. 24, 2003

(65) Prior Publication Data

US 2004/0258587 A1    Dec. 23, 2004

(30) Foreign Application Priority Data

Oct. 18, 2001    (GB) ................................ 0124999.4

(51) Int. Cl.
B01J 19/24   (2006.01)
B01J 8/02    (2006.01)
F28D 9/00    (2006.01)

(52) U.S. Cl. ...................... 422/190; 422/211; 422/222; 48/127.9; 48/127.7; 48/127.5

(58) Field of Classification Search .............. 422/211, 422/222, 190, 177, 174; 518/704; 48/127.9, 48/127.7, 127.5

See application file for complete search history.

(56) References Cited

U.S. PATENT DOCUMENTS

| 1,662,870 | A | | 3/1928 | Stancliffe | |
| 4,214,867 | A | | 7/1980 | Hunter | ......................... 432/29 |
| 5,328,359 | A | * | 7/1994 | Retallick | .................... 431/326 |
| 5,342,588 | A | * | 8/1994 | Humpolik | .................... 422/311 |
| 5,534,328 | A | | 7/1996 | Ashmead | .................... 428/166 |
| 5,672,629 | A | * | 9/1997 | Heil et al. | .................. 518/704 |
| 5,811,062 | A | | 9/1998 | Wegeng | ...................... 422/129 |
| 6,200,536 | B1 | | 3/2001 | Tonkovich | .................. 422/177 |

(Continued)

FOREIGN PATENT DOCUMENTS

DE    3926466    2/1991

(Continued)

*Primary Examiner*—N. Bhat
(74) *Attorney, Agent, or Firm*—William H. Holt

(57) ABSTRACT

A catalytic reactor comprises a stack of sheets defining flow channels between them. Within each flow channel is a flexible wire structure whose surfaces are coated with catalytic material. Flow channels for a first gas extend along S-shaped curved paths whereas the flow channels for a second gas are straight. The reactor incorporates header chambers to supply gas mixtures to the flow channels, each header chamber being a rectangular cap attached to a face of the stack. The reactor enables different gas mixtures to be supplied to adjacent channels, which nay be at different pressures, and the corresponding chemical reactions are also different. Where one of the reactions is endothermic while the other reaction is exothermic, heat is transferred through the sheets separating the adjacent channels, from the exothermic reaction to the endothermic reaction. When the catalyst in one set of flow channels becomes spent, it can be replaced by removing a header.

17 Claims, 2 Drawing Sheets

U.S. PATENT DOCUMENTS

| | | | |
|---|---|---|---|
| 6,284,217 B1 | 9/2001 | Wang | 423/651 |
| 6,440,895 B1 | 8/2002 | Tonkovich | 502/439 |
| 6,451,864 B1 | 9/2002 | Wang | 518/715 |
| 6,488,838 B1 | 12/2002 | Tonkovich | 208/108 |
| 6,616,909 B1* | 9/2003 | Tonkovich et al. | 423/648.1 |
| 2003/0105172 A1* | 6/2003 | Bowe et al. | 518/728 |
| 2004/0237307 A1* | 12/2004 | Takahashi | 29/898.13 |
| 2005/0013769 A1* | 1/2005 | Bowe et al. | 423/652 |
| 2005/0234138 A1* | 10/2005 | Bowe | 518/726 |

FOREIGN PATENT DOCUMENTS

| | | |
|---|---|---|
| DE | 19854361 A1 | 6/1998 |
| DE | 19906672 A1 | 8/2000 |
| DE | 19947803 A1 | 4/2001 |
| EP | 0212878 | 3/1987 |
| EP | 0885653 * | 6/1988 |
| EP | 0292245 | 11/1988 |
| EP | 0416710 | 3/1991 |
| EP | 0430184 | 6/1991 |
| EP | 0 571 056 * | 5/1993 |
| EP | 0 724 069 * | 7/1996 |
| EP | 0885653 | 12/1998 |
| GB | 1490977 | 11/1977 |
| GB | 1 531 134 * | 11/1978 |
| GB | 1531134 | 11/1978 |
| GB | 1 546 097 * | 5/1979 |
| GB | 1546097 | 5/1979 |
| WO | 98/38147 | 9/1998 |
| WO | 01/12312 | 2/2001 |
| WO | 01/12323 | 2/2001 |
| WO | 01/12753 | 2/2001 |
| WO | WO 01/51194 * | 7/2002 |
| WO | 02/064248 | 8/2002 |
| WO | 02/066371 | 8/2002 |
| WO | WO 03/0333132 * | 4/2003 |

* cited by examiner

CATALYTIC REACTOR

This invention relates to a catalytic reactor suitable for use in performing gas phase reactions, and particularly but not exclusively for performing highly exothermic and endothermic reactions, and also to a chemical process using the catalytic reactor.

The use of catalytic material supported on a metal substrate is well known. For example GB 1 490 977 describes a catalyst comprising an aluminium-bearing ferritic alloy substrate, coated with a layer of a refractory oxide such as alumina, titania or zirconia, and then with a catalytic platinum-group metal. As described in GB 1 531 134 and GB 1 546 097, a catalyst body may comprise substantially flat sheets and corrugated sheets of such material arranged alternately so as to define channels through the body, either several such sheets arranged in a stack, or two such sheets wound together to form a coil. In these examples both the flat sheets and the corrugated sheets have small-scale corrugations superimposed upon them to help in the formation of the coating. Such catalyst bodies are described as being suitable for use in treating exhaust gas from vehicles. In this context heat transfer between one channel and an adjacent channel is not a consideration, as all the channels carry the same gases at the same pressures. EP 0 885 653 A (Friedrich et al.) describes a compact heat exchanger for catalytic reactions in which flow channels are defined by a single long sheet of metal folded into a concertina, with corrugated foils located between successive plates of the concertina; the corrugated foils are catalyst supports and enhance heat transfer between the channels, and in one example the gases on one side of the sheet undergo an exothermic reaction while those on the other side undergo an endothermic reaction.

According to the present invention there is provided a catalytic reactor comprising a plurality of metal pass around the bend or bends in the channel. It preferably also makes good thermal contact with the wall of the channel along its entire length, and typically the first flow channels are of substantially circular cross-section transverse to the flow direction.

The second flow channels may be straight, in which case they may be of rectangular cross-section (transverse to the flow direction), and the first flow channels are preferably S-shaped so the ends of the second flow channels are on different faces of the stack than the ends of the first flow channels. The first flow channels might perhaps be C-shaped, but then would be of different lengths. If catalyst elements are required in the second flow channels, they may be of corrugated or dimpled foil.

Alternatively the second flow channels may also be curved in plan, arranged so the ends of the first flow channels are on different faces of the stack from the ends of the second flow channels. If catalyst elements are required in the second flow channels they must comprise fluid-permeable catalyst elements similar to those in the first flow channels, and the second flow channels should also be of width less than 4 mm, and preferably are of substantially circular cross-section transverse to the flow direction.

Removal of a header exposes the open ends of the corresponding flow channels, so each catalyst element (whatever it is made of) can be removed by sliding it out of the flow channel through the open end.

Preferably the sheets are flat, with grooves machined or etched across their surfaces to define the flow channels. The flow channels of substantially circular cross-section are preferably defined by semi-circular grooves in opposed surfaces of adjacent sheets. The reactor might therefore comprise a stack of such flat plates sufficiently thick to withstand the necessary pressure difference, the grooves in adjacent plates following appropriate paths. If grooves defining the second flow channels are straight, they may be for example 20 mm wide, this width being determined by the pressure difference to which the sheet is exposed. Bonding the plates together, for example by diffusion bonding, ensures that the flow channels are gas tight.

In one use of the catalytic reactor, the gas mixture supplied to each channel is different from the gas mixture supplied to the adjacent channels, and the corresponding chemical reactions are also different. One of the reactions may be endothermic while the other reaction is exothermic. In that case heat is transferred through the wall of the sheet separating the adjacent channels, from the exothermic reaction to the endothermic reaction.

This reactor is particularly suitable for performing steam reforming of hydrocarbons (which is an endothermic reaction, generating hydrogen and carbon monoxide), and the alternate channels might contain a hydrocarbon/air mixture so that an exothermic oxidation reaction provides the necessary heat for the endothermic reforming reaction. For the oxidation reaction several different catalysts may be used, for example palladium, platinum or copper on a ceramic support; for example copper or platinum on an alumina support stabilised with lanthanum, cerium or barium, or palladium on zirconia, or palladium on a metal hexaaluminate such as magnesium, calcium, strontium, barium or potassium hexaaluminate. For the reforming reaction also several different catalysts may be used, for example nickel, platinum, palladium, ruthenium or rhodium, which may be used on ceramic coatings; the preferred catalyst for the reforming reaction is rhodium or platinum on alumina or stabilised alumina. The oxidation reaction may be carried out at substantially atmospheric pressure, or at an elevated pressure, while the reforming reaction may be carried out at elevated pressure, for example up to 2 MPa (20 atmospheres), more typically in the range 0 to 200 kPa above atmospheric pressure.

It will be appreciated that the materials of which the reactor are made may be subjected to a severely corrosive atmosphere in use, for example the temperature may be as high as 900° C., although more typically around 850° C. The reactor may be made of a metal such as an aluminium-bearing ferritic steel, in particular of the type known as Fecralloy (trade mark) which is iron with up to 20% chromium, 0.5–12% aluminium, and 0.1–3% yttrium. For example it might comprise iron with 15% chromium, 4% aluminium, and 0.3% yttrium. When this metal is heated in air it forms an adherent oxide coating of alumina which protects the alloy against further oxidation; this oxide layer also protects the alloy against corrosion under conditions that prevail within for example a methane oxidation reactor or a steam/methane reforming reactor. Where this metal is used as a catalyst substrate, and is coated with a ceramic layer into which a catalyst material is incorporated, the alumina oxide layer on the metal is believed to bind with the ceramic coating, so ensuring the catalytic material adheres to the metal substrate.

A problem with any catalytic reactor is that the catalyst may become less active, and hence need to be replaced. Since the reactors are designed to be suitable for use at high temperatures and pressures the plates are bonded together by a process such as diffusion bonding (which ensures gas-tight sealing), but it would be desirable to be able to reuse the bulk of the structure while being able to replace the catalysts.

Furthermore co-current or counter-current flow of the two gas streams is desirable, rather than transverse flow, to achieve a satisfactory temperature distribution; the J or S flow directions of at least one set of gas channels enable this to be at least approximately achieved.

For some purposes the catalyst metal might instead be deposited directly onto the adherent oxide coating of the metal (without any ceramic layer).

Especially if the reactor is to be used for an endothermic reaction, it may be desirable to raise the temperature of the reactor to a desired operating temperature by direct electrical heating, passing electric current through the sheets that form the reactor. This would typically only be done initially, the heat subsequently being provided by an exothermic reaction carried out in the second gas flow channels or by hot gases (for example exhaust gases from an external combustion process such as a laminar flow burner).

BRIEF DESCRIPTION OF THE DRAWINGS

The invention will now be further and more particularly described, by way of example only, and with reference to the accompanying drawings in which.

Figure 1:
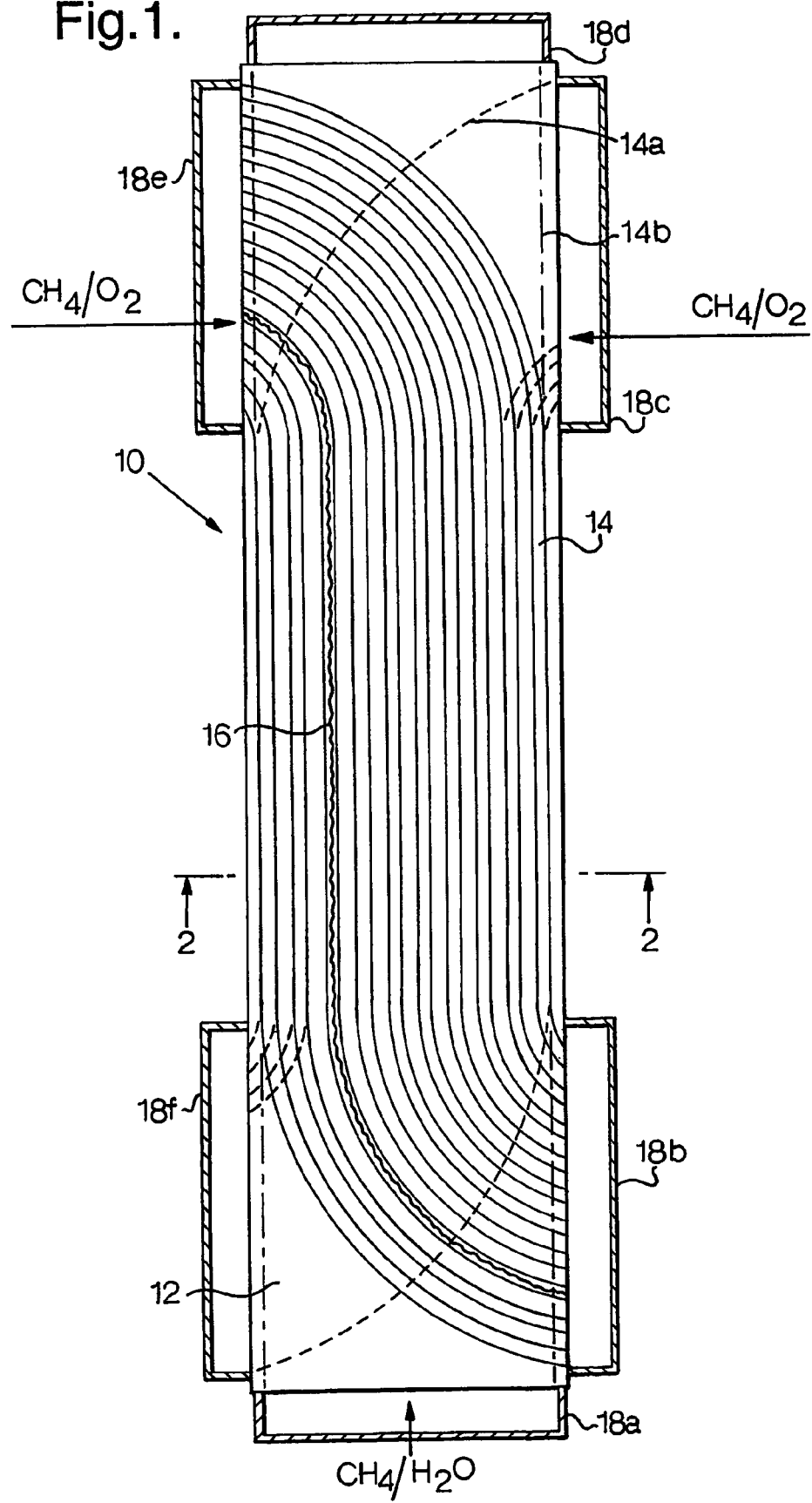
FIG. 1 shows a cross sectional view of a reactor.

Reactors of the invention may be used in a chemical process for converting methane to longer chain hydrocarbons. The first stage involves steam/methane reforming, that is to say the reaction:

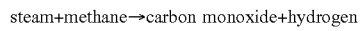
steam+methane→carbon monoxide+hydrogen

This reaction is endothermic, and may be catalysed by a rhodium catalyst in a first gas flow channel. The heat required to cause this reaction may be provided by combustion of methane, that is to say:

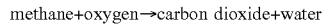
methane+oxygen→carbon dioxide+water which is an exothermic reaction, and may be catalysed by a palladium catalyst in an adjacent second gas flow channel. Both these reactions may take place at atmospheric pressure, although alternatively the reforming reaction might take place at an elevated pressure. The heat generated by the combustion reaction would be conducted through the metal sheet separating the adjacent channels.

The gas mixture produced by the steam/methane reforming is called synthesis gas. The hydrogen may itself be a desired product, for example for use in a fuel cell. Alternatively the gas mixture can then be used to perform a Fischer-Tropsch synthesis, that is to say:

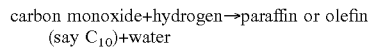
carbon monoxide+hydrogen→paraffin or olefin (say $C_{10}$)+water which is an exothermic reaction, occurring at an elevated temperature, typically between 200 and 350° C., for example 280° C., and an elevated pressure typically between 2 MPa and 4 MPa, for example 2.5 MPa, in the presence of a catalyst such as iron, cobalt or fused magnetite, with a potassium or ruthenium promoter. The exact nature of the organic compounds formed by the reaction depends on the pressure, the temperature, and the catalyst, as well as the ratio of carbon monoxide to hydrogen. The heat given out by this synthesis reaction may be used to provide at least part of the heat required by the steam/methane reforming reaction, for example a heat transfer fluid such as water, helium or Dowtherm A (trade mark of Dow Chemical) may be used to transfer the heat from a reactor in which the Fischer-Tropsch synthesis is occurring, the heat being used to preheat at least one of the gas streams supplied to the reforming reactor.

For example, in the reforming step, a feed gas that consists primarily of methane with a small percentage (say 10%) of ethane and propane is heated to about 400° C., mixed with a stream of steam that is also at about 400° C. and is then supplied to a catalytic reactor. Both streams may be at atmospheric pressure, or for example at a pressure of say 100 kPa above atmospheric. The flows are preferably such that the steam: methane molar ratio is between 1:1 and 2:1. The first part of the reactor is a pre-reformer with a nickel methanation catalyst at 400° C., in which the higher alkanes react with the steam to form methane (and carbon monoxide); this pre-reformer is not required if the feed gas contains substantially no higher alkanes. The second part of the reactor is a reformer with a platinum/rhodium catalyst, in which the methane and steam react to form carbon monoxide and hydrogen. This reaction may be performed at 850° C. The heat for the endothermic reactions may be provided by combustion of methane over a palladium or platinum catalyst within adjacent gas flow channels, or alternatively from exhaust gases from an external combustion unit such as a laminar flow burner, the gases from the burner flowing in counter-current to the gas flow through the reformer; this can enable the reacting gases in the reformer to reach a final temperature of as much as 1000° C. Where catalytic combustion is used, the catalyst may incorporate a metal hexaaluminate (such as magnesium hexaaluminate) as the substrate, but a preferred catalyst is platinum and palladium (10% weight) on γ-alumina. The methane/oxygen mixture may be supplied in stages along the reactor, to ensure combustion occurs throughout its length.

The hot mixture of carbon monoxide and hydrogen emerging from the reformer may be used to provide heat to the steam and to the feed gas. It may then be further processed, for example being compressed and supplied to a catalytic reactor in which the gases react, undergoing Fischer-Tropsch synthesis to form a paraffin or similar compound. The overall result of the processes is that methane is converted to higher molecular weight hydrocarbons which are typically liquids at ambient temperatures. The desired hydrocarbons can therefore be separated from the remaining gases by cooling, so the liquids condense. The processes may be used at an oil or gas well to convert methane gas into a liquid hydrocarbon which is easier to transport.

Referring now to FIG. 1 a reactor 10 (suitable for example for steam/methane reforming) comprises a stack of plates 12 each of Fecralloy steel, each rectangular (for example 0.2 m wide and 1.0 m long) and 1.5 mm thick.

Figure 2:
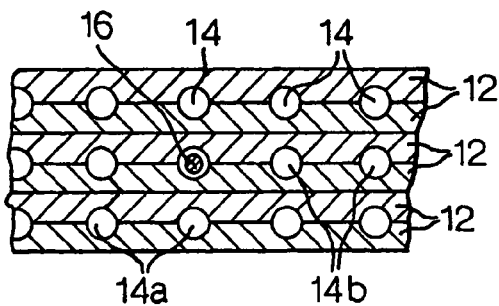
FIG. 2 shows a fragmentary sectional view on the line 2—2 of FIG. 1.

Semicircular grooves 14 of width 2 mm and depth 1.0 mm are machined in each plate, extending across each plate 12 from one side to the opposite side, separated by lands 15 of width 3 mm (for simplicity only ten such grooves 14 are shown in the figure). In the plate as shown the grooves follow S-shaped paths, with a straight section along the middle of the plate 12 and curves at each end so the grooves 14 extend along curved paths from the bottom right to the top left (as shown). The next plate in the stack has corresponding grooves on its lower surface, so that the resulting channels are of circular cross-section; throughout the stack the gas flow channels are defined by similar pairs of plates, as shown in FIG. 2. However, there are three different arrangements of the grooves 14 and hence different paths followed by the gas flow channels. In a second type of plate 12 the grooves 14a (as indicated by broken lines) follow a mirror image pattern, extending along S-shaped curved paths from bottom left to top right as shown. In a third type of plate 12 the grooves 14b (as indicated by chain dotted lines) extend parallel to the longitudinal axis of the plate 12.

A stack of such plates 12 is assembled, the orientation of the grooves 14 in successive plates 12 being such that each of the third type of pair of plates 12 (with the longitudinal grooves 14b) is between a pair with S-shaped grooves 14 and a pair of plates 12 with mirror image grooves 14a; the stack is then compressed and diffusion bonded together. The resulting structure is strong, forming a three-dimensional lattice. Flexible wire catalyst carriers 16 (only one is shown) are then inserted into each groove 14, 14a and 14b. Headers 18 are then attached to the faces of the assembled stack.

Figure 3:
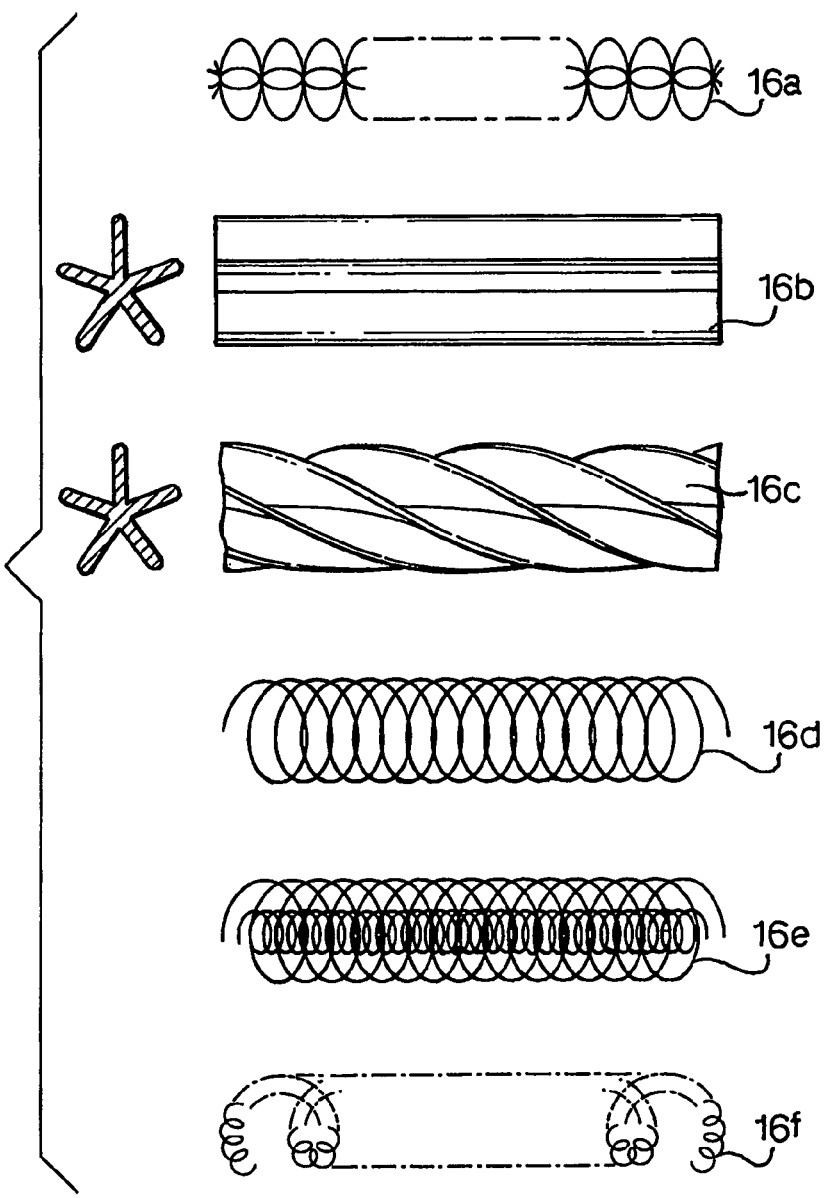
FIG. 3 shows side views of catalyst elements suitable for use in the reactor of FIG. 1.

As shown in FIG. 3, the catalyst carrier wires 16 may be of a variety of forms, in each case the substrate preferably being of Fecralloy alloy subsequently coated with ceramic and catalyst. In one case the wire 16a is formed of several thin wires wound together loosely to form loops. In the second and third examples the wire is fluted or ribbed, for example with five ribs, which are either straight (16b) or helical (16c). In the next example the wire 16d is a simple helical coil, or alternatively the wire 16e may comprise two such helical coils arranged coaxially. Another example is a wire 16f formed as a coiled coil. A tangled structure of metal wires or fibres (not shown) might also be used.

The steam/methane mixture is supplied to the header 18a, to flow through the longitudinal grooves 14b and the resulting mixture of hydrogen and carbon monoxide emerges through the header 18d. Methane/air mixture is supplied through the headers 18c and 18e (i. e. the headers on either side of the header 18d), so exhaust gas from the combustion process emerges through the headers 18b and 18f. Hence the gas flows are at least partially counter-current, so that the hottest region in the combustion channels, which is near the inlet to those channels, is closest to the outlet for the steam/methane reforming reaction.

The headers 18 each comprise a simple rectangular cap sealed around its periphery to the outside of the stack so as to cover part of one face of the stack. They may be welded onto the outside of the stack. Alternatively, if neither of the gas flows are at elevated pressures, it may be adequate to clamp the header chambers 18 onto the outside of the stack. In either case it will be appreciated that after a period of use, if the catalyst in any of the channels has become spent, then the headers 18 may be removed or cut off and the corresponding catalyst-carrying wires 16 removed and replaced. The headers 18 can then be re-attached.

It will be understood that the type of ceramic deposited on the wires 16 in the gas flow channels may be different in successive pairs of plates 12 in the stack, and that the catalyst materials may differ also. For example the ceramic might comprise alumina in one of the gas flow channels, and zirconia in the other gas flow channels. The reactor 10 formed from the plates 12 might also be suitable for performing Fischer-Tropsch synthesis. Because the plates 12 forming the stack are bonded together the gas flow channels are gas tight (apart from communication with headers 18 at each end), and the dimensions of the plates 12 and grooves 14 are such that pressures in the alternate gas flow channels may be considerably different. Furthermore the wires 16 may vary in form along a channel, and may have different catalyst loading along their length to adjust catalytic activity and hence provide control over the reaction rates or temperatures at different positions in the reactor 10. Furthermore parts of the wires 16 may be devoid of catalyst.

In a modification to the reactor 10, the wires 16 are again of Fecralloy material, but the catalyst material is deposited directly onto the oxide layer of the Fecralloy.

It will be appreciated that, as an alternative, the steam/methane reforming reaction might take place in the curved gas flow channels 14 and 14a with the combustion taking place in the longitudinal channels 14b. In an alternative mode of use, the combustion takes place in an external burner (such as a laminar flow burner), the very hot exhaust gases at about 900 or 1000° C. being passed through the flow channels of the reactor 10 in place of the methane/air mixture, in counter-current to the methane/steam flow. In this case it is not necessary to provide catalyst wires 16 in those channels.

As a further alternative there might be just two different shapes of flow channel, which may each be S-shaped (as channels 14 and 14a); or alternatively each being J-shaped, one gas flow being between equivalents to header 18a and header 18c, and the other gas flow being between equivalents to header 18d and header 18f. Such flow channels would be arranged alternately in the stack, and only the one pair of headers 18 is required for each gas flow. Another alternative would be to replace the straight flow channels 14 with straight channels of rectangular cross-section, say 20 mm wide and 2 mm high, into which a corrugated foil catalyst carrier may be inserted.

In another alternative the grooves 14, 14a or 14b may instead be of non-circular cross-section, for example oval or square cross-section. Furthermore any one channel 14, 14a or 14b may be defined by a groove in just a single plate 12, being for example of semicircular cross-section, or a groove as deep or deeper than its width.

In a further modification the plates 12 that resist the pressure difference between the flow channels are of a metal such as 304 or 310 stainless steel or titanium, or of Incalloy 800 HT, that can withstand the high temperatures and the pressures and which can be readily diffusion bonded, while the wires 16 are of Fecralloy steel if a ceramic coating (as a catalyst substrate) is required.

In the combustion channels of the catalytic reactor 14, if catalytic combustion is used to generate the heat (as indicated), the combustion catalyst may itself be coated with a thin porous inert ceramic layer, so as to restrict the contact of the gas mixture with the catalyst and so restrict the reaction rate, particularly at the start of the channel, if a more gradual approach to maximum temperature is required.

As mentioned earlier, electrical heating by passing an electric current directly through the plates forming the reactor may be used initially to raise the temperature of the catalytic reactor to say 400° C. before supplying gases, to ensure a catalytic combustion occurs. Such electrical heating may also be used during operation to adjust the reactor temperature. Electrical heating may also be used in the vicinity of the outlet from the reactor to ensure that a temperature of say 900° C. is reached by the gases undergoing the reforming reaction.

The invention claimed is:

1. A catalytic reactor comprising a plurality of metal sheets arranged as a stack and bonded together, said sheets defining first flow channels between adjacent sheets, alternating with second flow channels between adjacent sheets for ensuring good thermal contact between fluids in the first and the second flow channels, at least the first flow channels being of width less than 4 mm and following a curved path in plan, fluid-permeable catalyst elements being insertable into and removable from within at least the first flow channels along said curved path, said catalyst elements being flexible for following said curved path during insertion and removal thereof, headers to supply respective fluid to the flow channels, each first header comprising a chamber attached to the outside of the stack and communicating with a plurality of first flow channels, and each second header comprising a chamber attached to the outside of the stack and communicating with a plurality of second flow channels, and such that after removal of a header said catalyst elements in the corresponding flow channels are removable.

2. A catalytic reactor as claimed in claim 1 wherein the catalyst elements comprise fluid-permeable flexible metal elements with a catalyst coating.

3. A catalytic reactor as claimed in claim 2 wherein the second flow channels are also curved in plan, arranged so the ends of the first flow channels are on different faces of the stack from the ends of the second flow channels.

4. A catalytic reactor as claimed in claim 2 wherein the second flow channels are straight, and the first flow channels on either side of a second flow channel follow mirror image paths.

5. A catalytic reactor as claimed in claim 2 wherein the sheets are flat, with grooves machined or etched across their surfaces to define the flow channels.

6. A plant for processing methane to produce longer chain hydrocarbons, the plant comprising a first catalytic reactor for performing steam/methane reforming and a second catalytic reactor for performing Fisher-Tropsch synthesis, each catalytic reactor being a catalytic reactor as claimed in claim 2; means for transferring the products of the first catalytic reactor to the second catalytic reactor, the transferring means incorporating at least one heat exchanger to remove heat from the said products and at least one compression means for increasing the pressure of the said products; and means to condense liquid components of the fluid mixture resulting from the Fisher-Tropsch synthesis.

7. A catalytic reactor as claimed in claim 1 wherein the second flow channels are also curved in plan, arranged so the ends of the first flow channels are on different faces of the stack from the ends of the second flow channels.

8. A catalytic reactor as claimed in claim 7 wherein the sheets are flat, with grooves machined or etched across their surfaces to define the flow channels.

9. A plant for processing methane to produce longer chain hydrocarbons, the plant comprising a first catalytic reactor for performing steam/methane reforming and a second catalytic reactor for performing Fisher-Tropsch synthesis, each catalytic reactor being a catalytic reactor as claimed in claim 7; means for transferring the products of the first catalytic reactor to the second catalytic reactor, the transferring means incorporating at least one heat exchanger to remove heat from the said products and at least one compression means for increasing the pressure of the said products; and means to condense liquid components of the fluid mixture resulting from the Fisher-Tropsch synthesis.

10. A catalytic reactor as claimed in claim 1 wherein the second flow channels are straight, and the first flow channels on either side of a second flow channel follow mirror image paths.

11. A catalytic reactor as claimed in claim 10 wherein the sheets are flat, with grooves machined or etched across their surfaces to define the flow channels.

12. A plant for processing methane to produce longer chain hydrocarbons, the plant comprising a first catalytic reactor for performing steam/methane reforming and a second catalytic reactor for performing Fisher-Tropsch synthesis, each catalytic reactor being a catalytic reactor as claimed in claim 10; means for transferring the products of the first catalytic reactor to the second catalytic reactor, the transferring means incorporating at least one heat exchanger to remove heat from the said products and at least one compression means for increasing the pressure of the said products; and means to condense liquid components of the fluid mixture resulting from the Fisher-Tropsch synthesis.

13. A catalytic reactor as claimed in claim 1 wherein the sheets are flat, with grooves machined or etched across their surfaces to define the flow channels.

14. A catalytic reactor as claimed in claim 13 wherein at least the first flow channels are of substantially circular cross-section and are defined by grooves of semicircular cross-section in opposed surfaces of adjacent sheets.

15. A plant for processing methane to produce longer chain hydrocarbons, the plant comprising a first catalytic reactor for performing steam/methane reforming and a second catalytic reactor for performing Fisher-Tropsch synthesis, each catalytic reactor being a catalytic reactor as claimed in claim 13; means for transferring the products of the first catalytic reactor to the second catalytic reactor, the transferring means incorporating at least one heat exchanger to remove heat from the said products and at least one compression means for increasing the pressure of the said products; and means to condense liquid components of the fluid mixture resulting from the Fisher-Tropsch synthesis.

16. A plant for processing methane to produce longer chain hydrocarbons, the plant comprising a first catalytic reactor for performing steam/methane reforming and a second catalytic reactor for performing Fisher-Tropsch synthesis, each catalytic reactor being a catalytic reactor as claimed in claim 14; means for transferring the products of the first catalytic reactor to the second catalytic reactor, the transferring means incorporating at least one heat exchanger to remove heat from the said products and at least one compression means for increasing the pressure of the said products; and means to condense liquid components of the fluid mixture resulting from the Fisher-Tropsch synthesis.

17. A plant for processing methane to produce longer chain hydrocarbons, the plant comprising a first catalytic reactor for performing steam/methane reforming and a second catalytic reactor for performing Fisher-Tropsch synthesis, each catalytic reactor being a catalytic reactor as claimed in claim 1; means for transferring the products of the first catalytic reactor to the second catalytic reactor, the transferring means incorporating at least one heat exchanger to remove heat from the said products and at least one compression means for increasing the pressure of the said products; and means to condense liquid components of the fluid mixture resulting from the Fisher-Tropsch synthesis.

* * * * *